(12) United States Patent
Hung et al.

(10) Patent No.: US 9,280,232 B2
(45) Date of Patent: Mar. 8, 2016

(54) TOUCH DETECTION METHOD AND ASSOCIATED APPARATUS

(71) Applicant: MStar Semiconductor, Inc., Hsinchu Hsien (TW)

(72) Inventors: Guo-Kiang Hung, New Taipei (TW);
Hsuan-I Pan, Taipei (TW);
Chao-Cheng Wen, Zhunan Township (TW); Hsien-Keng Lin, Zhubei (TW);
Kuo-Chao Liao, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 80 days.

(21) Appl. No.: 14/174,922

(22) Filed: Feb. 7, 2014

(65) Prior Publication Data

US 2014/0218323 A1  Aug. 7, 2014

(30) Foreign Application Priority Data

Feb. 7, 2013 (TW) .............................. 102104828 A

(51) Int. Cl.
*G06F 3/041* (2006.01)
(52) U.S. Cl.
CPC .................................. *G06F 3/0416* (2013.01)

(58) Field of Classification Search
USPC ........................................................ 345/173
See application file for complete search history.

(56) References Cited

U.S. PATENT DOCUMENTS

| 2010/0013791 | A1* | 1/2010 | Haga et al. ..................... 345/174 |
| 2013/0194229 | A1* | 8/2013 | Sabo et al. ..................... 345/174 |

FOREIGN PATENT DOCUMENTS

TW  201234338 A  8/2012

OTHER PUBLICATIONS

Taiwan Office Action, Mar. 23, 2015, 4 pages.

* cited by examiner

*Primary Examiner* — Shaheda Abdin
(74) *Attorney, Agent, or Firm* — Edell, Shapiro & Finnan, LLC

(57) ABSTRACT

A method for touch detection is provided for detecting a touch point on a display device. The method includes: providing a display signal, according to which the display device has two parts of a vertical blanking interval within each frame period, wherein the two parts of the vertical blanking interval are discontinuous; and performing a touch detection in the two parts of the vertical blanking interval, respectively. The touch detection method is capable of performing multiple touch detections within one frame period.

10 Claims, 6 Drawing Sheets

TOUCH DETECTION METHOD AND ASSOCIATED APPARATUS

This application claims the benefit of Taiwan application Serial No. 102104828, filed Feb. 7, 2013, the subject matter of which is incorporated herein by reference.

BACKGROUND OF THE INVENTION

1. Field of the Invention

The invention relates in general to a touch detection method and an associated apparatus, and more particularly, to a touch detection method applied when a display device displays a blanking interval and an associated apparatus.

2. Description of the Related Art

In a display architecture of a liquid-crystal display (LCD) panel, gate drivers and source drivers are controlled by timing signals generated by a timing controller to drive a frame and thus complete display of an entire frame. A source driver provides data to be displayed by pixels, i.e., provides voltage signals corresponding to different grayscales. A gate driver, in a unit of rows, controls a plurality of pixels at the same row to simultaneously receive the data provided by the source driver. More specifically, the timing controller controls the source driver to sequentially convert data to be displayed by pixels at a $1^{st}$ row, a $2^{nd}$ row, a $3^{rd}$ row ... an $N^{th}$ row of a frame to corresponding voltage signals at an output end of the source driver, and controls the gate driver to have the pixels at the $1^{st}$, the $2^{nd}$, the $3^{rd}$ and the $N^{th}$ row of a frame receive the voltage signals respectively outputted by the source driver.

When a display device is equipped with a touch function, in the prior art, a touch detection circuit usually performs functions such as data access, computations and transmission of touch point information while the display device displays a vertical blanking interval. In a blanking interval, source drivers and gate drivers do not at all update data of any pixel, and thus noise interference on a panel during such blanking interval is minimal. A vertical blanking interval is the time difference between the end of the display of one frame and the beginning of the display of a next frame. Further, a horizontal blanking interval is the time difference between pixels of one row stop receiving data provided by a source driver and pixels of a next row start receiving data provided by the source driver.

Compared to the vertical blanking interval, the horizontal blanking interval is too short to carry out a complete touch detection procedure, and so the horizontal blanking interval is not conventionally adopted for touch detection. Although the vertical blanking interval is sufficient for carrying out a complete touch detection procedure, it is only available between having updated one frame and starting to update a next frame. Within the vertical blanking interval, a touch detection circuit is required to perform the above functions of data access, computations and transmission of touch point information, meaning that the number of times and timings for touch detection are limited. For example, within one frame period, the prior art can only perform one touch detection procedure after having updated one frame. Therefore, there is a need for a solution for improving the above limitation.

SUMMARY OF THE INVENTION

It is an objective of the present invention to provide a touch detection method and an associated method, which are capable of performing multiple touch detections within one frame period to improve issues of the prior art.

A touch detection method for detecting a touch point on a display device is disclosed according to an embodiment of the present invention. The method includes: providing a display signal, according to which the display device has two parts of a vertical blanking interval within each frame period, wherein the two parts of the vertical blanking interval are discontinuous; and performing a touch detection in the two parts of the vertical blanking interval, respectively.

A touch detection method for detecting a touch point on a display device is disclosed according to another embodiment of the present invention. The method includes: performing a touch detection on a first block of the display device within a first horizontal blanking interval of a frame period; and performing the touch detection on a second block of the display device within a second horizontal blanking interval of the frame period.

A touch detection apparatus for detecting a touch point on a display device is disclosed according to another embodiment of the present invention. The apparatus includes: a timing controller, configured to provide a display signal, according to which the display device has two parts of a vertical blanking interval within each frame period, wherein the two parts of the vertical blanking interval are discontinuous; and a touch detection circuit, configured to perform a touch detection in the two parts of the vertical blanking interval, respectively.

A touch detection apparatus for detecting a touch point on a display device is disclosed according to yet another embodiment of the present invention. The apparatus includes: a timing controller, configured to provide a detection start signal; and a touch detection circuit, configured to perform a touch detection on a first block of the display device in a first horizontal blanking interval of a frame period and to perform the touch detection on a second block of the display device in a second horizontal blanking interval of the frame period according to the detection start signal.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on general definition in the technical field of the application. If the application describes or explains one or some terms, definition of the terms are based on the description or explanation of the application. In possible implementation, in the application, the relationship between objects or events includes a direct relationship or an indirect relationship. The indirect relationship refers to that there are intermediate objects or space between the objects or there are intermediate events or timing periods between the events. Further, shapes, sizes and ratios of the objects are exemplary for one skilled person in the art to understand the application, not to limit the application.

Each of the disclosed embodiments has one or more technical features. However, it does not mean that implementation of the application needs every technical feature of any embodiment of the application or combination of the embodiments of the application is prohibited. In other words, in possible implementation, one skilled person in the art would selectively implement part or all technical features of any embodiment of the application or selectively combine part or all technical features of the embodiments of the application based on the disclosure of the application and his/her own need. Implementation of the application is flexible.

The disclosure of the application includes a touch detection method and an associated apparatus. The method and apparatus are applied to detect a touch point on a display device, so a touch detection circuit is enabled to more efficiently perform functions of data access, computations and transmission of touch point information according to requirements. For example, according to the present invention, multiple touch detections can be performed within one frame period instead of performing the touch detection only after having updated one frame. The above example is for one person skilled in the art to better understand the present invention, not limiting the present invention. In possible implementation, one skilled person in the art may choose equivalent elements or steps to implement the disclosure based on the disclosure of the application. That is, the implementation of the disclosure is not limited by the embodiments disclosed in the disclosure. Further, part or all components of the touch detection apparatus of the present invention are individually known elements. Therefore, without affecting the full disclosure and possible implementation of the apparatus, details of known individual components are omitted herein. Moreover, the touch detection method of the present invention may be performed by the touch detection apparatus of the present invention, or other touch detection apparatuses. Similarly, without affecting the full disclosure and possible implementation of the method of the application, details of hardware devices for performing the method are omitted herein.

Figure 1:
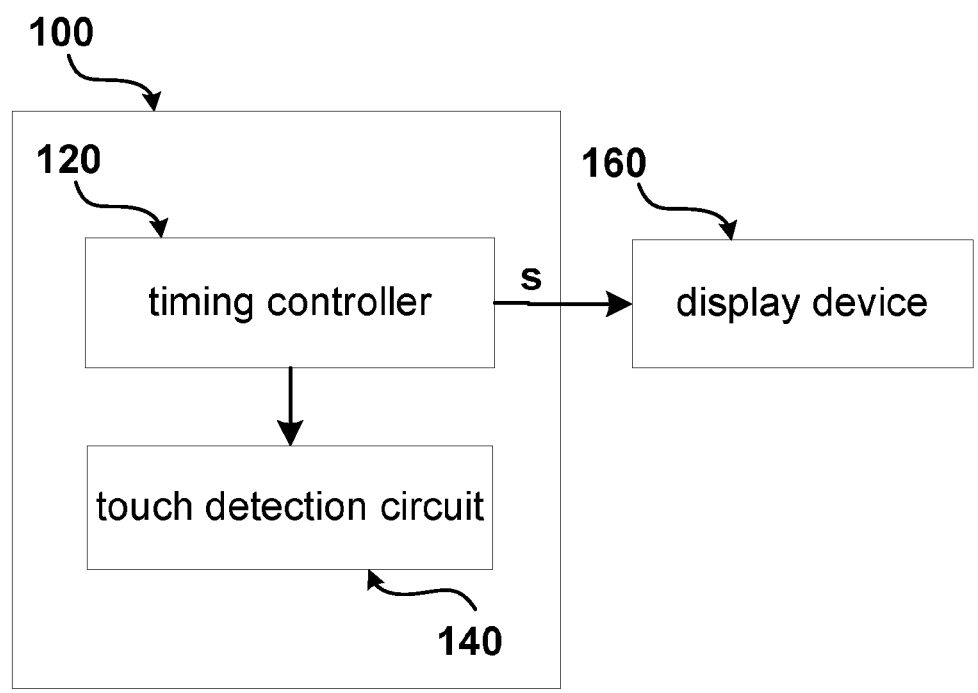
FIG. 1 is a block diagram of a touch detection apparatus according to an embodiment of the present invention.

FIG. 1 shows a block diagram of a touch detection apparatus according to an embodiment of the present invention. A touch detection apparatus 100, applied to detect a touch point on a display device, includes a timing controller 120 and a touch detection circuit 140. The timing controller 120 provides a display signal s, so that a display device 160 has at least two discontinuous vertical blanking intervals within each frame period according to the display signal s. The touch detection circuit 140 performs a touch detection within the vertical blanking intervals, respectively.

Figure 2:
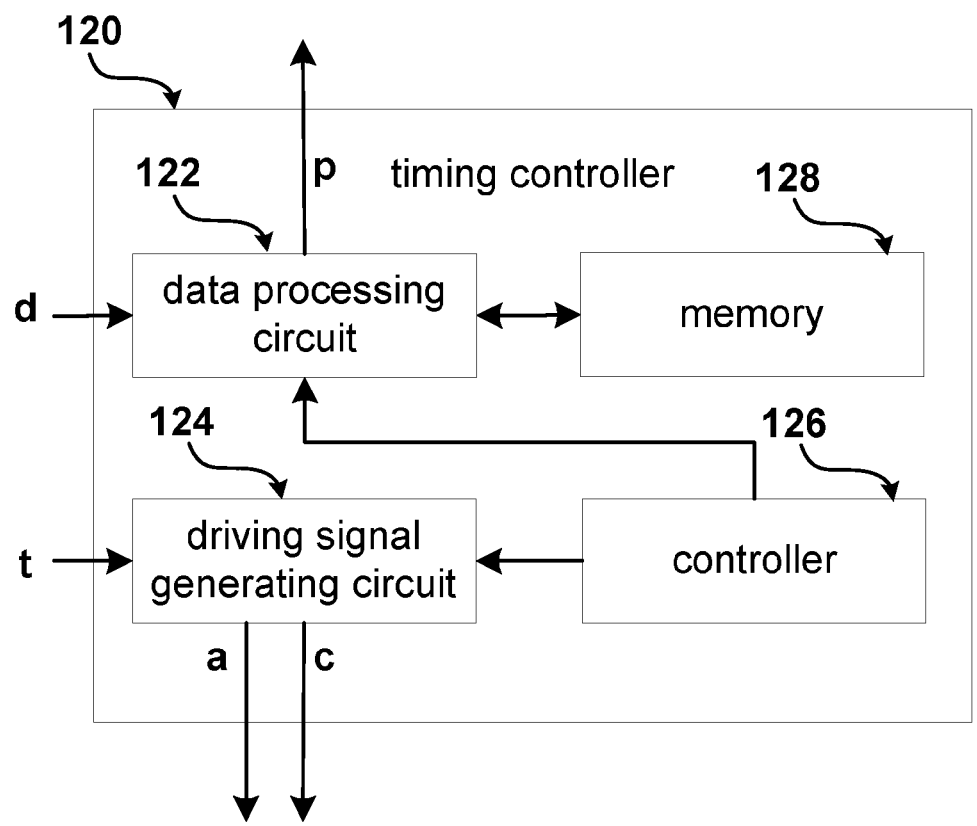
FIG. 2 is a block diagram of a timing controller in a touch detection apparatus according to an embodiment of the present invention.

FIG. 2 shows a block diagram of a timing controller of a touch detection apparatus according to an embodiment of the present invention. The timing controller 120 includes a data processing circuit 122, a driving signal generating circuit 124, a controller 126 and a memory 128. More specifically, the data processing circuit 122 receives image data d, and generates a plurality of pixel data p according to requirements of a panel of the display device 160. For example, the data processing circuit 122 performs appropriate conversions on the image data d to generate the pixel data p. The driving signal generating circuit 124 receives a synchronization signal t to accordingly generate a plurality of timing control signals c. The pixel data p and the timing control signals c form a display signal s outputted by the timing controller 120. The timing controller 120 outputs the display signal s to a panel driver (not shown) of the display device 160 to control the display device 160.

The controller 126, coupled to the data processing circuit 122 and the driving signal generating circuit 124, controls the data processing circuit 122 to perform a delay process on at least a part of data of pixels (to be referred to as pixel data) of each frame in the image data d, and correspondingly controls the driving signal generating circuit 124 such that at least two discontinuous vertical blanking intervals are present in each frame period. The memory 128, coupled to the data processing circuit 122, temporarily stores the pixel data to be delayed therein while the data processing circuit 122 performs the delay process. In one embodiment, the image data d inputted into the data processing circuit 122 includes data of multiple frames, each of which includes N rows of pixels, where N is a positive integer. The synchronization signal inputted into the driving signal generating circuit 124 includes a vertical synchronization signal corresponding to each frame and a horizontal synchronization signal corresponding to data of pixels at each row in a frame. The data of each frame is continuously inputted one row after another into the data processing circuit 122 during a corresponding vertical enable period in the vertical synchronization signal. To provide two discontinuous vertical blanking intervals within one frame period, and to have one of the vertical blanking intervals to be between the display device 160 updates an $M^{th}$-row pixels and updates $(M+1)^{th}$-row pixels of a frame, at the time when the data processing circuit 122 receives data of the $(M+1)^{th}$-row pixels of a frame, the controller 126 controls the data processing circuit 122 to start sequentially writing data of the $(M+1)^{th}$-row pixels to the $N^{th}$-row pixels into the memory 128. After delaying for a predetermined period, the data processing circuit 122 sequentially accesses the data of the $(M+1)^{th}$-row pixels to the $N^{th}$-row pixels from the memory 128, processes the accessed data, and outputs the processed data to the display device 160. The length of the predetermined period is determined according to the required vertical blanking interval. In order to correctly display the delayed pixel data by the display device 160, the controller 126 correspondingly controls the driving signal generating circuit 124 to generate a timing control signal c corresponding to the delayed pixel data, thereby enabling the panel driver of the display device 160 to correctly receive the delayed pixels and to drive the panel. In practice, the memory 128 may be excluded from the timing controller 120. Further, the touch detection circuit 140 is coupled to the driving signal generating circuit 124, which generates a detection start signal a. The detection start signal is used to control the touch detection circuit 140 to perform the touch detection on the panel of the display device 160 within the foregoing vertical blanking interval.

Figure 3:
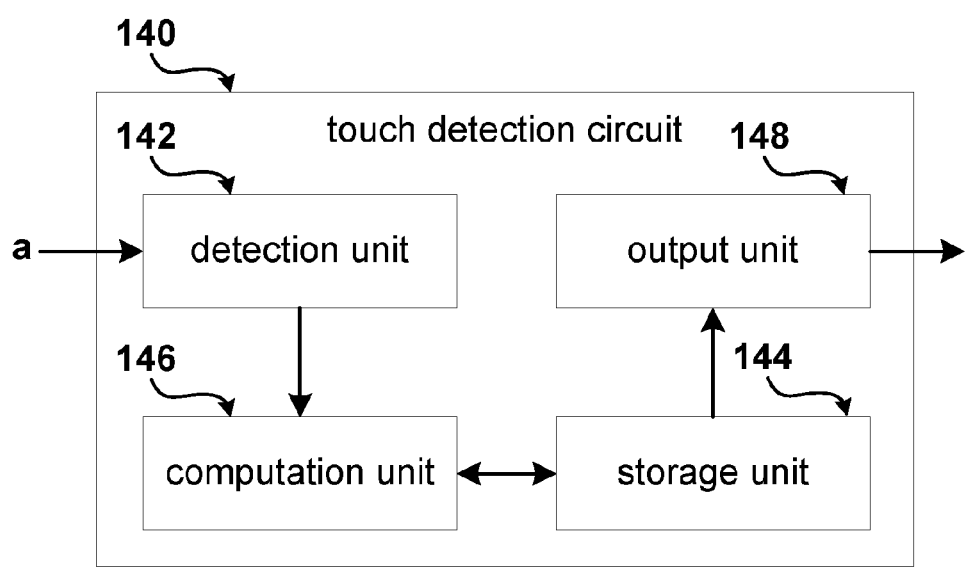
FIG. 3 is a block diagram of a touch detection circuit in a touch detection apparatus according to an embodiment of the present invention.

FIG. 3 shows a block diagram of the touch detection circuit 140 in the touch detection apparatus 100 according to an embodiment of the present invention. According to a detection start signal a sent by the driving signal generating circuit 124, the touch detection circuit 140 performs a touch detection in at least two discontinuous vertical blanking intervals within each frame period, respectively. The touch detection circuit 140 includes a detection unit 142, a storage unit 144 and a computation unit 146. The detection unit 142, coupled to the driving signal generating circuit 124, receives the detection start signal a, and performs the touch detection according to the detection start signal a to obtain a touch detection result. The computation unit 146, coupled to the detection unit 142, computes the touch detection result to generate touch point information. The storage unit 144, coupled to the computation unit 146, stores the touch point information. The touch detection circuit 140 may further include an output unit 148. The output unit 148, coupled to the storage unit 144, outputs the touch point information stored in the storage unit 144 to a specific application program for further application at a specific time point. In practice, the detection unit 142 may temporarily store the obtained touch point information into the storage unit 144, and the computation unit 146 may directly output the generated touch point information to a specific application program for further application instead of temporarily storing the touch information in the storage unit 144.

Figure 4:
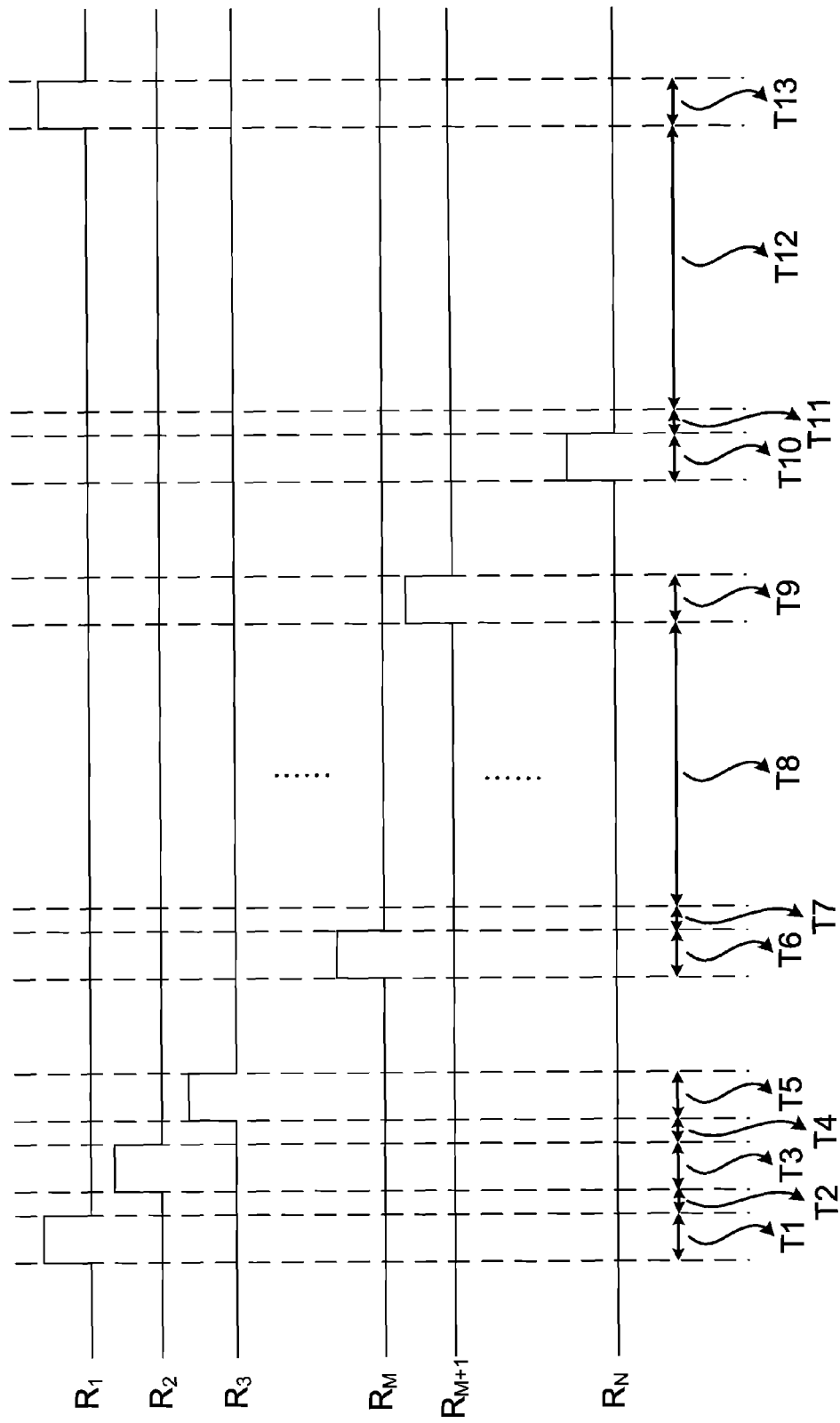
FIG. 4 is a timing diagram of a display device updating a frame according to an embodiment of the present invention.

In addition to the above touch detection apparatus 100, a touch detection method applied to the touch detection apparatus 100 is further provided by the present invention. FIG. 4 shows a timing diagram of a display device updating a frame according to an embodiment of the present invention. When the display device 160 updates pixel data of a frame, $1^{st}$-row pixels ($R_1$), $2^{nd}$-row pixels ($R_2$), $3^{rd}$-row pixels ($R_3$) . . . $M^{th}$-row pixels ($R_M$), $(M+1)^{th}$-row pixels ($R_{M+1}$) . . . and $N^{th}$-row pixels ($R_N$) are updated during a period T1, a period T3, a period T5 . . . a period T6, a period T9 . . . and a period T10 according to the display signal s. In a period T13, the $1^{st}$-row pixels ($R_1$) of a next frame are updated. Therefore, the periods T1 to T12 are a frame period, where the period T2, the period T4, the period T7 . . . and the period T11 are horizontal blanking intervals, and the period T8 and the period T12 are vertical blanking intervals. In the embodiment, the display device 160 is provided with at least two discontinuous vertical blanking intervals (i.e., the period T8 and the period T12) within each frame period, and the touch detection circuit 140 performs a touch detection in the vertical blanking intervals, respectively. Also referring to FIG. 1, details for updating a frame and the touch detection method are given below. In the period T1, the timing controller 120 outputs the display signal s to the panel driver of the display device 160, so as to control and update the $1^{st}$-row pixels ($R_1$) of the display device 160. In the period T3, the timing controller 120 outputs the display signal s to the panel driver of the display device 160, so as to control and update the $2^{nd}$-row pixels ($R_2$) of the display device 160. In the period T5, the timing controller 120 outputs the display signal s to the panel driver of the display device 160, so as to control and update the $3^{rd}$-row pixels ($R_3$) of the display device 160. The above step is iterated until the period T6, in which timing controller 120 outputs the display signal to the panel driver of the display device 160, so as to control and update the $M^{th}$-row pixels ($R_M$) of the display device 160. Next, to have the period T8 serving as a vertical blanking interval during which the touch detection circuit 140 is allowed to perform the touch detection, at the time when the data processing circuit 122 receives the data of the $(M+1)^{th}$-row pixels of the frame, the controller 126 controls the data processing circuit 122 to start sequentially writing the data of the $(M+1)^{th}$-row pixels to $N^{th}$-row pixels into the memory 128. After delaying for a predetermined period, the data processing circuit 122 sequentially accesses the data of the $(M+1)^{th}$-row pixels to $N^{th}$-row pixels from the memory 128, processes the accessed data, and then outputs the processed data. The length of the predetermined period is the length of the period T8. In order to correctly display the delayed pixel data by the display device 160, the controller 126 correspondingly controls the driving signal generating circuit 124 to generate a timing control signal c corresponding to the delayed pixel data. Accordingly, the panel driver of the display device 160 is enabled to correctly receive the delayed pixel data and drive the panel. During the period T9 to the period T10, the timing controller 120 outputs the delayed pixel data to the panel driver of the display device 160, so as to control the display device 160 to update the $(M+1)^{th}$-row pixels ($R_{M+1}$) to $N^{th}$-row pixels ($R_N$) of the frame. As the period T1 to the period T12 are one frame period, after the display device 160 finishes updating the $N^{th}$-row pixel ($R_N$) and after the horizontal blanking interval T11, the period T12 is another vertical blanking interval, during which the touch detection circuit 140 is allowed to perform the touch detection.

In another embodiment, through the same technical means, three discontinuous vertical blanking intervals may be provided within one frame period to allow the touch detection circuit 140 to perform three touch detections within one frame period. For example, when the display device 160 updates pixel data of a frame, the $1^{st}$-row pixels ($R_1$) to the $M^{th}$-row pixels ($R_M$) are sequentially updated. While the data processing circuit 122 receives the data of the $(M+1)^{th}$-row pixels of the frame, the controller 126 controls the data processing circuit 122 to start sequentially writing the data of the $(M+1)^{th}$-row pixels to the $N^{th}$-row pixels into the memory 128. After delaying for a predetermined period, e.g., a delay period Tx (i.e., the length of the first vertical blanking interval is equal to Tx), the processing circuit 122 sequentially accesses the previously written pixel data, starting from the $(M+1)^{th}$-row pixels, from the memory 128, processes the accessed data, and outputs the processed data. As such, the updating of the $(M+1)^{th}$-row pixels ($R_{M+1}$) to the $K^{th}$-row pixels (not shown) is complete, where K is a positive integer smaller than N and greater than M. While the data processing circuit 122 receives the data of the $(K+1)^{th}$-row pixels, the controller 127 controls the data processing circuit 122 to start delaying the data of the $(K+1)^{th}$-row pixels to the $N^{th}$-row pixels by a predetermined period, e.g., another delay period Tx. Thus, a second vertical blanking interval also having a length Tx is generated between updating the $K^{th}$-row pixels and the $(K+1)^{th}$-row pixels. The data processing circuit 122 then sequentially accesses the data previously written, starting from the $(K+1)^{th}$-row pixels, from the memory 128, processes the accessed data, and outputs the processed data. As such, the updating of the $(K+1)^{th}$-row pixels to the $N^{th}$-row pixels (not shown) is complete. It should be noted that the $(M+1)^{th}$-row pixels ($R_{M+1}$) to the $K^{th}$-row pixels (not shown) are delayed by the delay period Tx; the $(K+1)^{th}$-row pixels to the $N^{th}$-row pixels ($R_N$) are delayed by twice of the delay period Tx. With the first and second vertical blanking intervals, as well as the third vertical blanking interval between having updated the $N^{th}$-row pixels ($R_N$) and starting to update a next frame, the touch detection circuit 140 is enabled to perform three touch detections within one frame period. In another embodiment, through the same technical means, more than three discontinuous vertical blanking intervals may be provided within one frame period to perform more than three touch detections. Such details can be easily deduced by one person skilled in the art, and shall be omitted herein.

Figure 5:
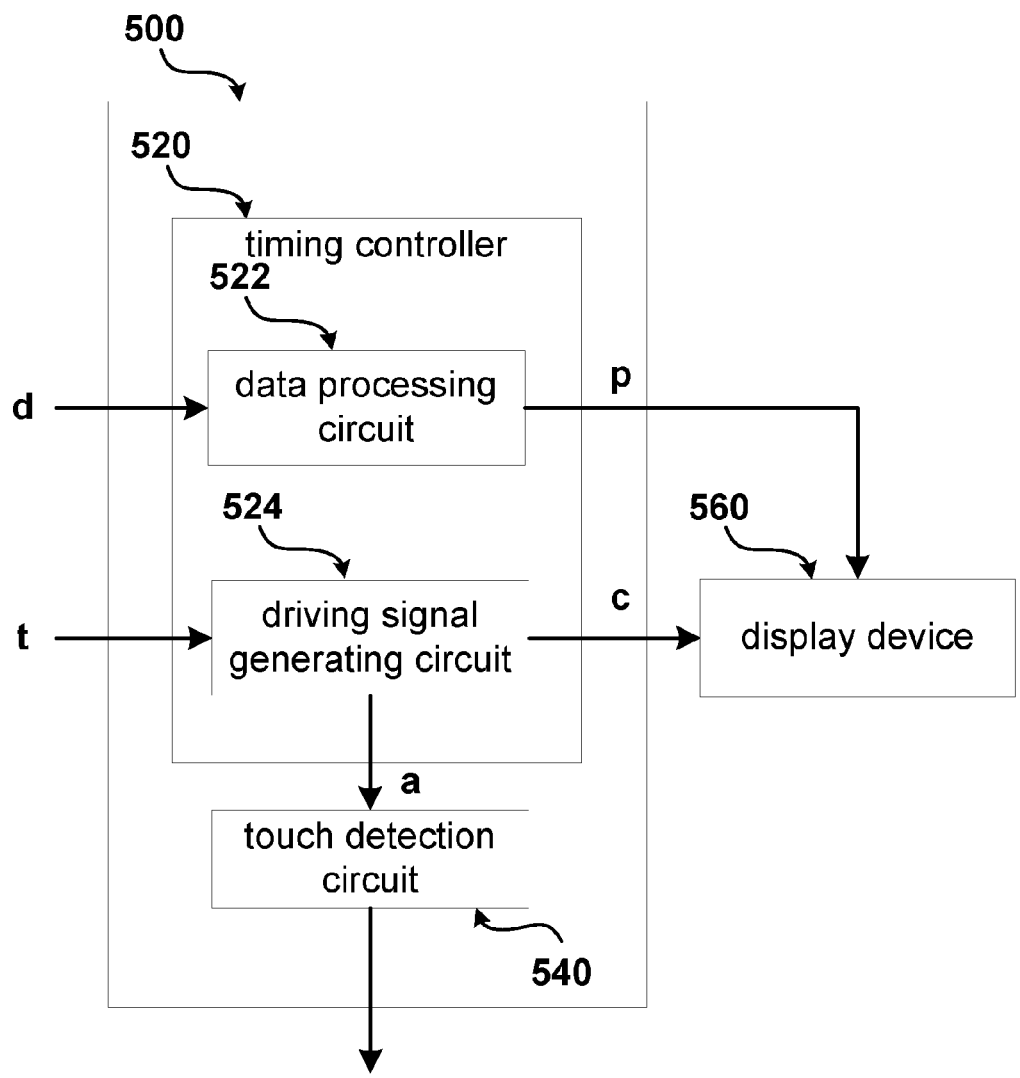
FIG. 5 is a block diagram of a touch detection apparatus according to another embodiment of the present invention.

FIG. 5 shows a block diagram of a touch detection apparatus according to another embodiment of the present invention. Referring to FIG. 5, a touch detection apparatus 500, applied to detect a touch point on a display device, includes a timing controller 520 and a touch detection circuit 540. The timing controller 520 provides a display signal and a detection start signal a. The display device 560 updates a frame according to the display signal. The detection start signal a is used to prompt the touch detection circuit 540 to perform a touch detection on different blocks of the display device 560 within two horizontal blanking intervals of a frame period, respectively.

The timing controller 520 includes a data processing circuit 522 and a driving signal generating circuit 524. More specifically, basic functions of the data processing circuit 522 are similar to those of the data processing circuit 122. That is, the data processing circuit 522 receives image data d, and generates a plurality of sets of pixel data p according to requirements of a panel of the display device 560. Basic functions of the driving signal generating circuit 524 are similar to those of the driving signal generating circuit 124. That is, the driving signal generating circuit 524 receives a synchronization signal t, and accordingly generates a plurality of timing control signals c. The pixel data p and the timing control signals c form a display signal outputted by the timing controller 520. The timing controller 520 outputs the display signal to the panel driver of the display device 560 to control the display device 560.

To allow the touch detection circuit 540 to perform the touch detection on different blocks of the display device within two horizontal blanking intervals of one frame period, respectively, the driving signal generating circuit 524 provides a detection start signal a to the touch detection circuit 540, such that the touch detection circuit 540 performs the touch detection on a first block of the display device 560 in a first horizontal blanking interval to obtain a touch detection result of the first block, and performs the touch detection on a second block of the display device 560 in a second horizontal blanking interval to obtain a touch detection result of the second block. Also referring to FIG. 3, the touch detection circuit 540 of the embodiment is similar to the touch detection circuit 140 in the touch detection device 100 of the present invention. The touch detection circuit 540, coupled to the driving signal generating circuit 524, receives the detection start signal a, and obtains the touch detection result of the first block in the first horizontal blanking interval and obtains the touch detection result of the second block in the second horizontal blanking interval according to the detection start signal a. In an embodiment, assuming that the display device 560 is divided into 10 blocks, the touch detection results of the 10 blocks can be respectively obtained in 10 horizontal blanking intervals, and the touch detection results of the 10 blocks are computed at a predetermined time point to generate touch point information. In the embodiment, the predetermined time point refers to a time point after respectively obtaining the touch detection results of the 10 blocks in the 10 horizontal blanking intervals. The touch detection circuit 540 may forward the touch point information to a specific application program for further application, or may temporarily store the touch point information. In another embodiment, through the same technical means, the above step may be iterated in multiple horizontal blanking intervals within one frame period, so that the touch detection circuit 540 is allowed to perform a greater number of touch detections within one frame period. For example, through the foregoing technical means, assume the display device 560 has an X number of rows of pixels and the display device is divided into 10 blocks, where X is a positive integer. As such, a Y number of touch detections may be performed within one frame period, where Y is a largest positive integer not greater than X/10. Further, the size of each of the blocks may be adjusted to adapt to the length of the horizontal blanking interval. That is to say, the display device may be divided into more or less than 10 blocks, and the touch detection may be respectively performed during different horizontal blanking intervals.

Figure 6:
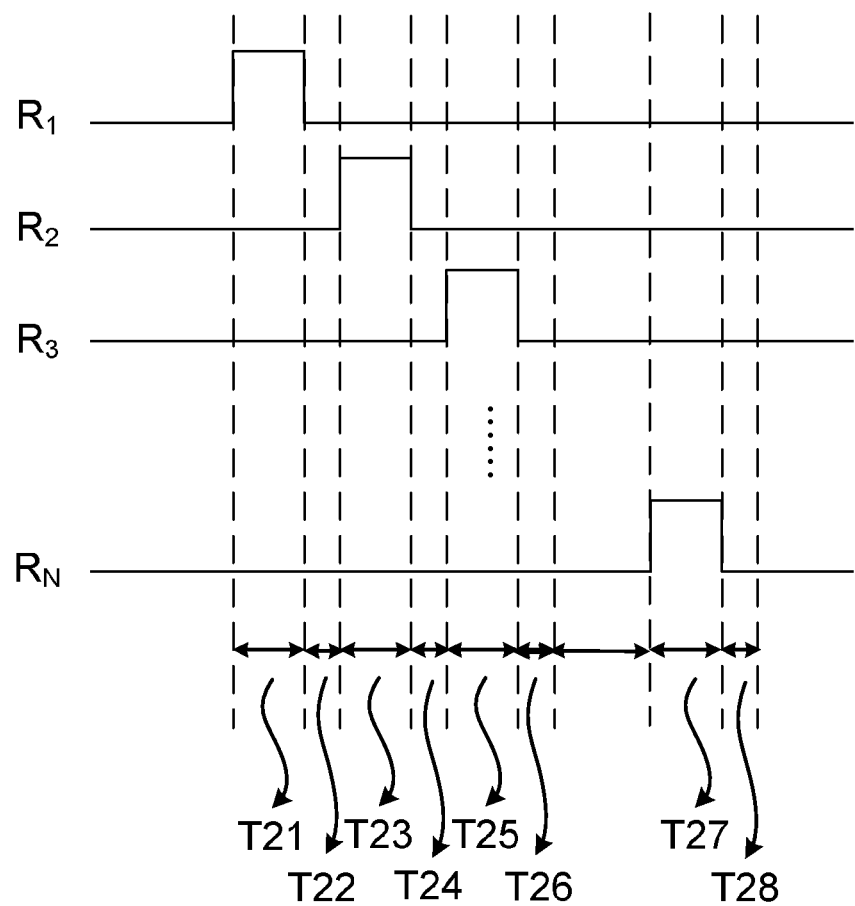
FIG. 6 is a timing diagram of a display device updating a frame according to another embodiment of the present invention.

The present invention further discloses a touch detection method applied to the touch detection apparatus 500. FIG. 6 shows a timing diagram of a display device updating a frame according to another embodiment of the present invention. When the display device 560 updates pixel data of a frame, $1^{st}$-row pixels ($R_1$), $2^{nd}$-row pixels ($R_2$), $3^{rd}$-row pixels ($R_3$) ... and $N^{th}$-row pixels ($R_N$) are respectively updated in a period T21, a period T23, a period T25 ... and a period T27 according to a display signal. A period T22, a period T24, a period 26 ... and a period T28 are horizontal blanking intervals. Also referring to FIG. 5, details for updating a frame and the touch detection method are given below. In the period T21, the timing controller 520 outputs the display signal to the panel driver of the display device 560, so as to control and update the $1^{st}$-row pixels ($R_1$) of the display device 560. In the period T23, the timing controller 520 outputs the display signal to the panel driver of the display device 560, so as to control and update the $2^{nd}$-row pixels ($R_2$) of the display device 560. In the period T25, the timing controller 520 outputs the display signal to the panel driver of the display device 560, so as to control and update the $3^{rd}$-row pixels ($R_3$) of the display device 560. The above step is iterated until the period T27, in which the timing controller 520 outputs the display signal to the panel driver of the display device 560, so as to control and update the $N^{th}$-row pixels ($R_N$) of the display device 560. To allow the touch detection circuit 540 to respectively perform the touch detection on different blocks of the display device within two horizontal blanking intervals of one frame period, the driving signal generating circuit 524 provides a detection start signal a to the touch detection circuit 540. According to the detection start signal a, the touch detection circuit 540, in the period T22 and the period T24, performs the touch detection on a first block of the display device 560 to obtain a touch detection result of the first block and performs the touch detection on a second block of the display device 560 to obtain a touch detection result of the second block, respectively.

The touch detection circuit 540, coupled to the driving signal generating circuit 524, receives the detection start signal, and obtains the touch detection result of the first block in the period T22 and obtains the touch detection result of the second block in the period T24 according to the detection start signal. Similarly, in an embodiment, assuming that the display device 560 is divided into 10 blocks, the touch detection results of the 10 blocks can be respectively obtained in 10 horizontal blanking intervals, and the touch detection results of the 10 blocks are computed at a predetermined time point to generate touch point information. In the embodiment, the predetermined time point refers to a time point after respectively obtaining the touch detection results of the 10 blocks in the 10 horizontal blanking intervals. The touch detection circuit 540 may forward the touch point information to a specific application program for further application, or may temporarily store the touch point information. In another embodiment, through the same technical means, the above step may be iterated in multiple horizontal blanking intervals within one frame period, so that the touch detection circuit 540 is allowed to perform a greater number of touch detections within one frame period. For example, through the foregoing technical means, assume the display device 560 has an X number of rows of pixels and the display device is divided into 10 blocks, where X is a positive integer. As such, a Y number of touch detections may be performed within one frame period, where Y is a largest positive integer not greater than X/10. Further, the size of each of the blocks may be adjusted to adapt to the length of the horizontal blanking interval. That is to say, the display device may be divided into more than 10 blocks or less than 10 blocks, and the touch detection may be respectively performed during different horizontal blanking intervals.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch detection method, for detecting a touch point on a display device, comprising:
   providing a display signal, according to which the display device has two parts of a vertical blanking interval within each frame period, wherein the two parts of the vertical blanking interval are discontinuous; and
   performing a touch detection in the two parts of the vertical blanking interval, respectively,
   wherein the display device comprises an N number of rows of pixels, a first part of vertical blanking interval of the two parts of the vertical blanking interval is between the display device updates $M^{th}$-row pixels and the display device updates $(M+1)^{th}$-row pixels, N and M are positive integers, and M is smaller than N.

2. The touch detection method according to claim 1, further comprising:
   generating a detection start signal to prompt a touch detection circuit to perform the touch detection in the first part of the vertical blanking interval.

3. The touch detection method according to claim 2, further comprising:
   computing a result of the touch detection to obtain touch point information after the first part of the vertical blanking interval.

4. The touch detection method according to claim 1, wherein the display signal comprises a plurality of timing control signals and a plurality of pixel data, the timing control signal respectively correspond to the pixel data, the method further comprising:
   performing a delay process on a part of the pixel data of an input frame, and generating corresponding timing control signals for the delayed pixel data, respectively.

5. The touch detection method according to claim 4, wherein the step of performing the delay process on the part of the pixel data of the input frame performs the delay process on the pixel data corresponding to the $(M+1)^{th}$-row pixels to the $N^{th}$-row pixels.

6. A touch detection apparatus, for detecting a touch point on a display device, comprising:
   a timing controller, configured to provide a display signal, according to which the display device has two parts of a vertical blanking interval within each frame period, wherein the two parts of the vertical blanking interval are discontinuous; and
   a touch detection circuit, configured to perform a touch detection in the two parts of the vertical blanking interval, respectively,
   wherein the display device comprises an N number of rows of pixels, a first part of the vertical blanking interval of the two parts of the vertical blanking interval is between the display device updates $M^{th}$-row pixels and the display device updates $(M+1)^{th}$-row pixels, N and M are positive integers, and M is smaller than N.

7. The touch detection apparatus according to claim 6, wherein the timing controller further generates a detection start signal to prompt the touch detection circuit to perform the touch detection in the first part of the vertical blanking interval.

8. The touch detection apparatus according to claim 6, the display signal comprises a plurality of timing control signals and a plurality of pixel data, and the timing controller performs a delay process on a part of the pixel data of an input frame and generates corresponding timing control signals for the delayed pixel data, respectively.

9. The touch detection apparatus according to claim 8, wherein the timing controller performs the delay process on the pixel data corresponding to the $(M+1)^{th}$-row pixels to the $N^{th}$-row pixels.

10. The touch detection apparatus according to claim 6, wherein the touch detection circuit computes a result of the touch detection after the first part of the vertical blanking interval to obtain touch point information.

* * * * *